United States Patent
Bernhard et al.

(10) Patent No.: US 7,193,792 B2
(45) Date of Patent: Mar. 20, 2007

(54) OPTICAL COMPONENT AND METHOD FOR ITS PRODUCTION

(75) Inventors: Heinz Bernhard, Berneck (CH); Marcel Bürki, Au (CH); Jürg Hinderling, Marbach (CH)

(73) Assignee: Leica Geosystems AG, Heerbrugg (CH)

(*) Notice: Subject to any disclaimer, the term of this patent is extended or adjusted under 35 U.S.C. 154(b) by 0 days.

(21) Appl. No.: 10/972,521

(22) Filed: Oct. 26, 2004

(65) Prior Publication Data
US 2005/0141105 A1  Jun. 30, 2005

(30) Foreign Application Priority Data
Oct. 29, 2003  (CH) .................................... 1846/03

(51) Int. Cl.
*G02B 3/00* (2006.01)
(52) U.S. Cl. .................. 359/722; 359/738; 359/741
(58) Field of Classification Search ............. 359/722, 359/732, 738, 741
See application file for complete search history.

(56) References Cited

U.S. PATENT DOCUMENTS

| | | | |
|---|---|---|---|
| 4,165,936 A | 8/1979 | Eisenring et al. | |
| 4,972,089 A | 11/1990 | Stevenson | |
| 4,979,411 A | 12/1990 | Murasaki et al. | |
| 5,138,131 A | 8/1992 | Nishikawa et al. | |
| 5,200,607 A | 4/1993 | Klima | |
| 5,311,271 A | 5/1994 | Hurt et al. | |
| 5,452,126 A * | 9/1995 | Johnson | 359/407 |
| 5,526,190 A * | 6/1996 | Hubble et al. | 359/719 |
| 5,774,208 A | 6/1998 | Abe | |

FOREIGN PATENT DOCUMENTS

| | | |
|---|---|---|
| DE | 27 45 565 C2 | 6/1978 |
| DE | 196 15 601 A1 | 1/1997 |
| EP | 0 391 671 A2 | 10/1990 |
| JP | A-10-073756 | 3/1998 |

OTHER PUBLICATIONS

Fritz Klocke et al., Mechatronic F&M; 104, 1-2; pp. 81-84; Carl Hanser Verlag Munich; 1996.

* cited by examiner

*Primary Examiner*—Jordan M. Schwartz
(74) *Attorney, Agent, or Firm*—Oliff & Berridge, PLC

(57) ABSTRACT

An optical component (10a) for at least two pencils (4, 5) of rays has at least one one-piece element (1, 2) of inorganic optical material and at least two segments (6, 7) which are coordinated with the pencils of rays and of which the first segment (6) is substantially surrounded by the at least one second segment (7). According to the invention, a depression (8a) is provided between the first and the at least one second segment (6 and 7), respectively. This is formed in such a way that the first segment (6) is substantially optically shielded from the at least one second segment (7) and is held by means of at least one material bridge from the second segment with a stable attitude thereto.

13 Claims, 2 Drawing Sheets

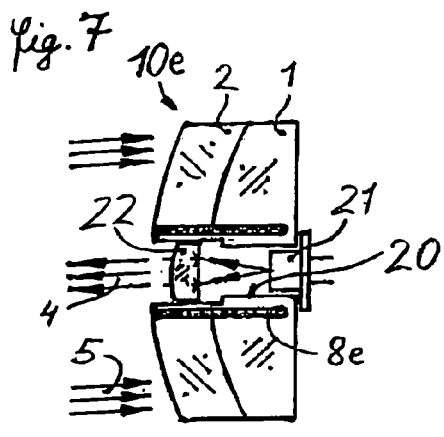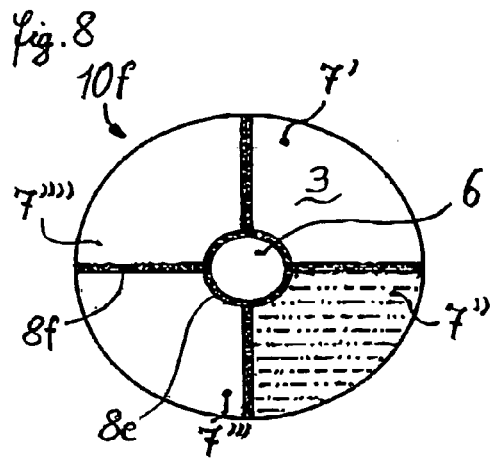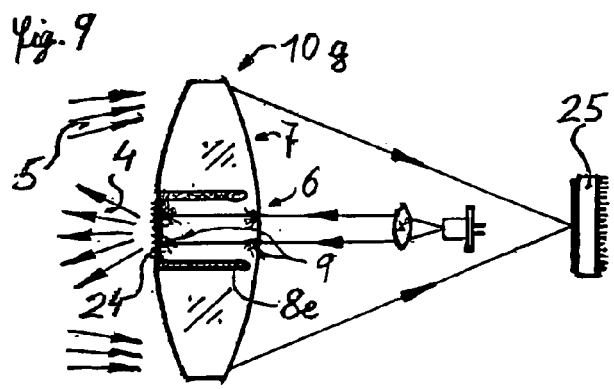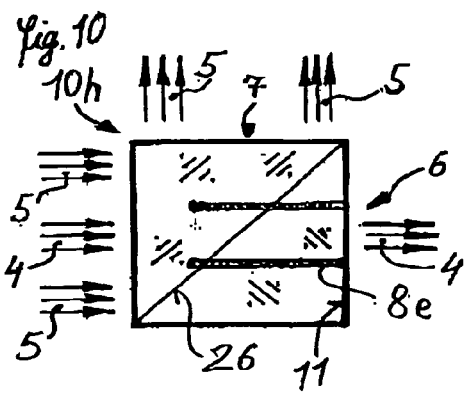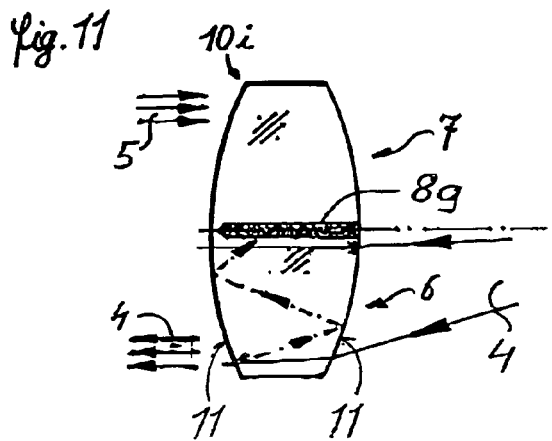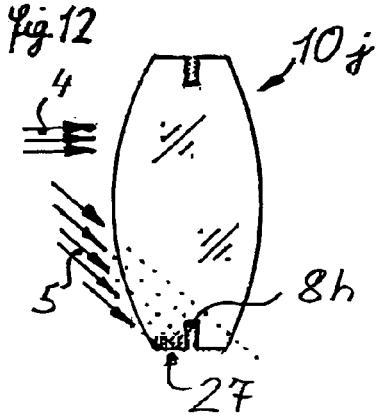

OPTICAL COMPONENT AND METHOD FOR ITS PRODUCTION

The invention relates to an optical component comprising at least one one-piece element of glass, quartz or other inorganic optical material for at least two pencils of rays, in each case according to the preamble of claims 1, 15, 16 and 17, a device for distance measurement and a surveying instrument according to the preamble of claim 13 or 14 and a method for the production of an optical component, in each case according to the preamble of claims 18 and 19.

Such optical components are part of many electro-optical devices for measuring physical quantities or for recording, monitoring, regulating or controlling processes. A pencil of optical rays which is suitable for the respective purpose is emitted by the device into its environment. The environment interacts with the emitted pencil and assigns to it a received pencil detectable by the device. Owing to the known manner of the respective interaction and the relevant assignment, the detected signal can then be appropriately evaluated.

However, if a part of the rays of the emitted pencil does not leave the device—for example owing to refractive or reflective scattering by an optical component—and then cannot be directly detected, so-called optical crosstalk of scattered rays of the emitted pencil with the received pencil is then present. A signal detected in this manner also contains a more or less strong interfering signal, caused by optical crosstalk, in addition to the actual useful signal of the received pencil. Consequently, the functioning of the device may be impaired since firstly the extent of optical crosstalk often can be quantified only with difficulty and since secondly—for example owing to dust or soiling of the surface of the optical component—the extent may vary as a function of time. Particularly in the case of highly sensitive sensors or instruments having high measurement resolution, targeted evaluation of the often weak useful signal is thus considerably complicated or the result of the evaluation is even falsified.

In general, the extent of optical crosstalk in a device is all the greater the closer together transmitted and received pencils are arranged, the larger an optionally present contact area common to both pencils is within the device or the more optical components are used jointly by the two pencils.

In the case of devices for distance measurement, optical crosstalk constitutes a problem in every respect. On passage of a transmitted pencil through optically active surfaces of optical elements—for example through lens surfaces or prism surfaces—a part of the rays of the transmitted pencil is inevitably refracted and reflected with scattering. A part—even if only a very small part—of these scattered rays passes via the optical component itself, via other components and/or via side walls of the device to the detector of the device, and is detected there together with rays of the received pencil which are reflected by the object to be measured. In this way, optical crosstalk may easily falsify the result of the distance measurement. This interfering effect is as a rule all the greater the weaker the rays of the received pencil which are reflected by the object. This is the case in particular in measurements to target objects at great distances or at a naturally rough surface reflecting with scattering.

Optical crosstalk can be suppressed in a manner known per se by an optically more or less shielded, separate optical system for the transmitted pencil. Since such a separate optical system can be relatively easily realized in the case of biaxial distance-measuring instruments—with transmitted and received pencil arranged internally side by side—this measure is used again and again. However, as a result of the expansion of the transmitting and receiving optical system necessary in each case, a certain distance between the effective axes of the transmitted and the received pencil is specified. Depending on the application, for example in the case of the coincidental measurement of a close corner cube prism, this distance is not permitted to exceed a specified, low value, with the result that a separate arrangement of the optical systems side by side is relatively impossible for many applications.

Combined transmitting and receiving objectives are known for reducing the distance between transmitted and received pencils, a cut-out for the edge region of the transmitting objective being provided in the edge region of the receiving objective. Before the two objective parts are combined, the adjacent edge regions of the two objective parts are provided with an optical barrier layer. Such a combined objective requires expensive individual optical elements having a non-standardized lens form and a complicated holder of the combined transmitting and receiving objective which nevertheless has a space, even if a small one, between the effective axes of the transmitted and received pencil, which space may rule out certain applications.

In surveying, theodolites having an integrated distance-measuring instrument whose transmitted and received pencils are oriented coaxially with the sighting axis of the telescope of the theodolite have become established today, with the result that, as a rule, the objective of the telescope is used jointly by the transmitted and received pencil. In particular owing to the jointly used objective, optical crosstalk occurs to a significant extent, necessitating countermeasures, which are often associated with considerable effort.

DE 27 45 565 C2 discloses such a theodolite having an integrated, coaxial distance-measuring instrument, whose objective has a plurality of optical and mechanical elements in order to avoid optical crosstalk of rays of the transmitted pencil which are scattered by the objective. Such an objective is associated with considerable effort in the design, production, assembly and adjustment of such a device. The more separate parts an optical system has, in general the lower also are the attitude stability and the maintenance of adjustment of the parts relative to one another, which may present problems in particular in the case of precision devices.

For this reason, theodolites having an integrated, coaxial distance-measuring instrument—as disclosed in DE 196 15 601 A1—today often have only one cemented component comprising two or more round optical elements. Optical crosstalk of rays of the transmitted pencil which are scattered by the cemented component results in a reduction-in the range, which, however, now has to be accepted in favor of the simplicity of the objective design.

If a plurality of different transmitted pencils and a plurality of received pencils are provided in a device, for example in a theodolite having two distance-measuring instruments and automatic sighting, problems associated with optical crosstalk may become even more critical.

Even in the case of an optical component in a device for the optical imaging of an object by means of a pencil of rays to be focused, scattered rays of an interfering pencil which are caused by the component—such as, for example, sunlight—which is incident obliquely relative to the imaging pencil, may give rise to problems. In the case of telescope tubes of surveying devices having high scale ratios, for example, the brightness of the imaging pencil is as a rule low, with the result that scattered rays which are caused by obliquely incident sunlight lead to a milky, low-contrast image. However, even in the case of the imaging of poorly illuminating objects, scattered rays of obliquely incident pencils of extraneous light considerably reduce the contrast of the image.

Various measures are known for suppressing scattered rays which are produced at an optical component by an obliquely incident interfering pencil. Thus, for example, the introduction of a lamellar metal structure into glass during fusion or extrusion has been proposed. However, the production of optical lenses from such a glass has still not been mastered. Furthermore, ion-doped special glasses in which lamellar black separating layers can be introduced in a targeted manner by UV irradiation are known. However, such special glasses are very expensive and are not available in all glass types customary for objectives—for example crown or flint.

SUMMARY OF THE INVENTION

It is an object of the invention to eliminate deficiencies of the prior art and to provide an optical component comprising a plurality of segments which are coordinated with a plurality of pencils of rays, which component causes only very little optical crosstalk and has high dimensional stability.

This object is achieved by an optical component and a method having the features of patent claims 1, 15, 16 and 17, and 18 and 19, respectively. Further alternative or advantageous developments and further developments of the invention are described in the features of the dependent patent claims.

An optical component for at least two pencils of rays has at least one one-piece element of glass, quartz or other inorganic optical material and at least two segments which are coordinated with the pencils of rays and of which the first segment is substantially surrounded by the at least one second segment. According to the invention, a depression is provided between the first and the at least one second segment. Said depression is formed in such a way that the first segment is substantially optically shielded from the at least one second segment and is kept in a stable position relative thereto by means of at least one material bridge from the second segment.

An embodiment of an optical component according to the invention has at least one optical element of glass, quartz or other inorganic optical material for a device for emitting a first pencil of rays and for receiving at least one second pencil of rays. A first segment is provided for the passage of the first and optionally of the at least one second pencil of rays, and at least one second segment for the passage of the at least one second pencil of rays. Provided between the first and the at least one second segment is at least one depression which is formed in such a way that, inside the device, optical crosstalk of rays of the first pencil which are scattered by the optical component with the at least one second pencil of rays is substantially prevented indirectly or directly. According to the invention, the at least one second segment substantially surrounds the first segment.

In the context of the invention, a depression in an optical component is to be understood as meaning a recess of arbitrary three-dimensional shape in the component. The depression according to the invention may not—similarly to a blind hole—pass through the component or pass partly through the component or may—similarly to a through-hole—pass through the component over the total cross-section of the depression.

A development of the invention envisages a depression which does not pass through, between a first and at least one second segment of the component, so that a material bridge remains between the bottom of the depression and an optical surface of the component. The first segment is held in a stable position relative to the second segment by means of this material bridge. The component forms a closed tight unit.

An alternative development of the invention envisages a depression which passes through, between a first and at least one second segment of the component, so that, as a rule, a plurality of material bridges extend at least partly, substantially in the direction of propagation of the pencil of rays, between the segments of the component. By means of these material bridges, the first segment is held in a stable position relative to the second segment. In general, such a component can be sealed by means of a filling material which is introduced into the depression and as a rule is non-transparent.

In particular, ultrasonic machining has proven suitable for introducing substantially slit-like depressions into an optical component. The optical elements of the component, which consist of glass, quartz or other organic optical material, promote ablation by means of ultrasonic machining, owing to their brittle material properties. By means of this method, depressions having a large variety of shapes, in particular having non-rotationally symmetrical shapes, can be introduced economically even into already polished, optionally coated and mounted optical components, virtually without permanent stresses. Moreover, there is no flaking or conchoidal fracture of optical surfaces, through which continuous depressions emerge.

Although the journal "Mechatronik F&M 104 (1996) 1-2; Carl Hanser Verlag Munich" has already disclosed ultrasonic machining methods for glass processing, these are said not to have become established as final processing methods in glass processing and not to have left the sphere of the laboratory, owing to the achievable accuracies and the low ablation powers.

It is also conceivable to introduce slit-like depressions with the aid of a power laser, whose wavelength is at least partly absorbed by the optical material, into an optical component.

The invention is explained in more detail below, purely by way of example, with reference to the figures. Identical parts in different embodiments which perform the same functions are provided below with identical designations and reference numerals. Schematically:

BRIEF DESCRIPTION OF THE DRAWINGS

FIG. 7 shows a fifth embodiment of the component according to the invention as an objective for a surveying instrument according to FIG. 1, in longitudinal section;

FIG. 8 shows a sixth embodiment of the component according to the invention as an objective for a further surveying instrument, in side view;

FIG. 9 shows a seventh embodiment of the component according to the invention as an objective for a device for the optical recording of an object, in cross-section;

FIG. 10 shows an eighth embodiment of the component according to the invention as a beam splitter for a device, in cross-section;

FIG. 11 shows a ninth embodiment as an objective for a further surveying instrument, in longitudinal section, and FIG. 12 shows a tenth embodiment as an objective for a device for imaging, in longitudinal section.

DETAILED DESCRIPTION

Figure 1:
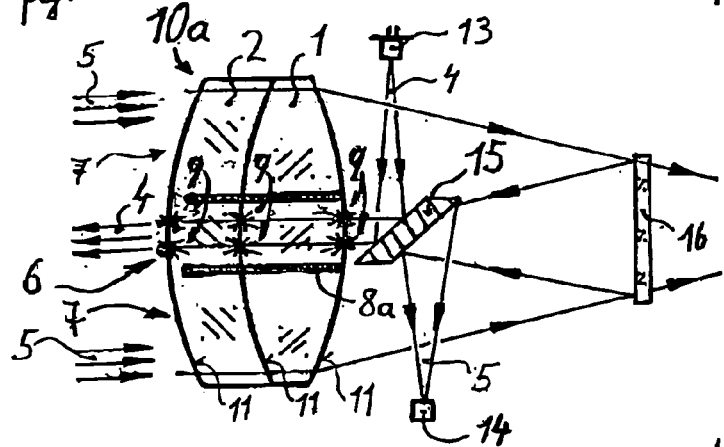
FIG. 1 shows a first embodiment of the optical component according to the invention as an objective in a surveying instrument, in longitudinal section.

FIG. 1 shows a telescope of a theodolite in longitudinal section. A device for distance measurement, the transmitted and received pencils of which are oriented coaxially with the line of sight of the telescope, is integrated in the telescope. A first embodiment of an optical component according to the invention is in the form of a common objective 10a for the viewing line of sight of the telescope, the transmitted pencil and the received pencil of the device for distance measurement.

The telescope comprising such a device furthermore has, in a manner known per se, a transmitter 13, a receiver 14, a central reflecting element 15, a wavelength-selective reflecting element 16 and an eyepiece. A first pencil 4 of rays which is in the form of a transmitted pencil, is produced here, for example, by a laser diode and has a hexagonal cross-section is emitted by the transmitter 13 via the central reflecting element 15 toward a target object not shown in FIG. 1. Here, the central reflecting element 15 is positioned on the optical axis of the objective 10a by means of a retaining element not shown in FIG. 1. Owing to optical reflection, a second pencil 5 of rays in the form of a received pencil is coordinated with the first pencil 4 of rays by the target object. The second pencil 5 of rays is directed via the wavelength-selective reflecting element 16 and the central reflecting element 15 to the receiver 14 and is detected there.

Here, the optical component according to the invention which is in the form of objective 10a is a cemented component comprising a first and a second optical element 1 and 2, respectively, which in turn are in the form of spherical lenses having in each case two polished and coated optical surfaces 11. Here, the two optical elements 1 and 2 are produced from one piece of optical glass. However, it would also be conceivable to produce such an optical element from quartz or another inorganic optical material. The optical component has a first segment 6 and a second segment 7 which surrounds said first segment and through which in each case the first pencil 4 of rays or the second pencil 5 of rays passes. Here, a slit-like depression 8a has been introduced, by means of a shaping lapping tool vibrating in the ultrasonic range, between the first and second segments 6 and 7, into the optical component already cemented together, through the first element 1 and into the second element 2. The slit-like depression passes through three of the four optical surfaces 11 and extends here up to the vicinity of the optical surface 11 on the object side, so that the remaining material of the one-piece, optical element 2 securely holds the first segment 6 of the optical component, with the result that the mechanical stability and geometrical dimensional stability of the optical component are nevertheless preserved-substantially unchanged. Furthermore, in spite of the slit-like depression, a closed tight component is present owing to the remaining material.

Figure 2:
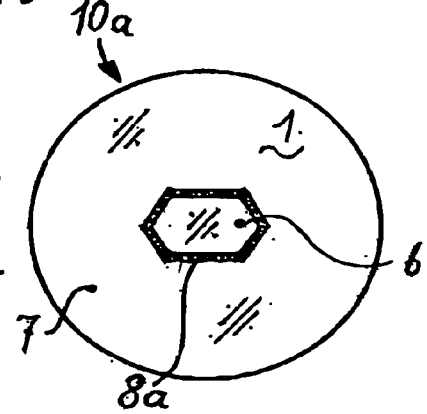
FIG. 2 shows the embodiment from FIG. 1 in cross-section.

The depth of the slit of the slit-like depression 8a—shown only schematically in FIGS. 1 and 2—extends substantially parallel to the direction of propagation of the first pencil 4 of rays and, for example, may have a value of seven millimeters. The optical component has a remaining material thickness of, for example, one millimeter between the optical surface 11 and the bottom of the slit-like depression 8a. The width of the slit, given here by two walls substantially parallel to one another, has a value of, for example, half a millimeter.

As a result of having been introduced by ultrasonic machining, the depression 8a has an optically rough surface which is provided here, for example, with a black coating and absorbs optical rays to a high degree. However, the depression 8a could also, for example, be blackened with ink or filled with a filler opaque to the corresponding rays, for example tar or non-transparent adhesive. In this way, blocking values of up to 100 optical decibels or more can be achieved depending on the formation of the depression.

If the first pencil 4 of rays passes through the first segment 6, rays 9 scattered by refraction or reflection are inevitably produced at each of the four optical surfaces 11. The major part of these scattered rays 9 is absorbed directly after production thereof via the optically rough surface of the depression 8a, which is introduced here into the objective 10a along the major part of the first segment 6, continuously around the latter, said optically rough surface being, for example, coated black. Since the absorbed scattered rays 9 can no longer reach the receiver 14 through reflections inside the telescope, the major part of the undesired optical crosstalk is thus prevented.

The more elongated the depression 8a and the closer to the optical surface 11 on the object side that the depression 8a is introduced, the larger the quantity of scattered rays 9 which can be absorbed by the depression 8a. A depression 8a located close to the first pencil 4 of rays thus favors the length/width ratio of the depression. Since low processing forces occur on introduction of the depression 8a by means of ultrasonic machining, in comparison with conventional drilling or milling using diamond tools, firstly the shaping lapping tool may be thin-walled and nevertheless elongated and secondly the material thickness of the component which remains in the region of the depression 8a can be chosen to be very small. The dimensioning of the remaining material thickness is predetermined here as a rule by the required mechanical stability of the optical component.

In a manner known per se, rays of the first pencil 4 which are reflected by the target object are partly prevented from penetrating to the receiver 14 by the central reflecting element 15. This can lead to receiving problems in the case of measurements to close target objects. Since, here, a further part of the rays reflected by the target object is also absorbed by the depression 8a, these problems become even more critical. The broader the slit of the depression 8a, the more critical does the problem become. The very small dimension of the width of the slit, which, in comparison with conventional milling, is achievable by means of ultrasonic machining, can thus be advantageously utilized both with respect to the stability of the optical component and with respect to the measurement to close target objects.

Furthermore, owing to the low processing forces of the ultrasonic machining, virtually no significant mechanical stresses of the component occur during the processing thereof. Consequently, permanent stresses in the optical component and an associated deterioration in the optical imaging quality of the regions surrounding the depression can also be avoided. Moreover, there is virtually no splintering of material on entry of the shaping tool into the component. The depression 8a can therefore even be introduced into already cemented and optionally already mechanically mounted optical components. The advantages of the flexibility of the process for manufacturing the optical components are obvious.

FIG. 2 shows a cross-section of the first embodiment of an optical component according to the invention, which is in the form of an objective 10a for the telescope from FIG. 1. The sectional plane passes through the center of the optical element 1 from FIG. 1. In this embodiment, the first segment 6 is located centrally within the second segment 7 and is surrounded continuously all round by the slit-like depression 8a.

The closer the depression 8a to the first pencil 4 of rays from FIG. 1, the greater the quantity of scattered rays of the first pencil 4 that are absorbed by the depression 8a. If, as in the first embodiment, the emitted first pencil 4 of rays has a hexagonal cross-section, the cross-section of the depression 8a here advantageously has a corresponding linear hexagonal shape. Since the depression 8a is available neither for the emission of the first pencil 4 of rays nor for the reception of the second pencil 5 of rays from FIG. 1, the usable fraction of the passage area of the optical component according to the invention is the greater the smaller the cross-sectional area of the slit of the depression 8a can be chosen. The very small values of the width of the slit which can be achieved by ultrasonic machining are therefore also advantageous with respect to the optimum utilization of the passage area of an optical component.

Figure 3:
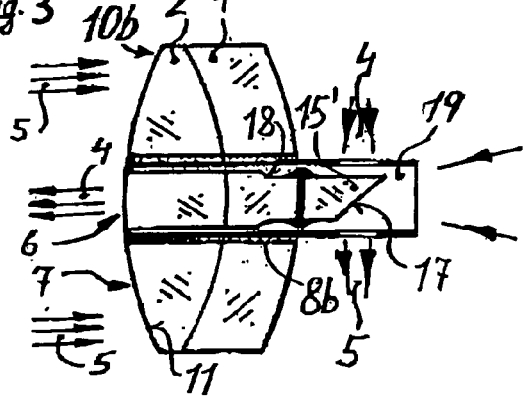
FIG. 3 shows a second embodiment of the component according to the invention as an objective for a surveying instrument according to FIG. 1, in longitudinal section.

FIG. 3 shows a second embodiment of an optical component according to the invention, which, as an alternative to the objective 10a from FIG. 1, is in the form of a further objective 10b having an integrated reflecting prism 15' for the telescope of the theodolite. The further objective 10b is in the form of a cemented component comprising two optical elements 1 and 2, the reflecting prism 15'—in contrast to the central reflecting element 15 from FIG. 1—being cemented to the first optical element 1. The reflecting prism 15' has a two-sided reflecting surface 17, on one side of which the first and on the other side of which the second pencil 4 and 5, respectively, of rays from FIG. 1 are reflected.

Before cementing to the reflecting prism 15', in contrast to the depression 8a from FIG. 1, two stepped depressions 8b passing through the two optical elements 1 and 2 are introduced into the further objective 10b by means of a lapping tool vibrating in the ultrasonic range and provided with a step. They have a step 18 in the fastening region for the reflecting prism 15'. The step acts as an adhesive buffer for the adhesive necessary for cementing the reflecting prism 15'. Removal of excess adhesive and cleaning are therefore unnecessary, with the result that the production process for the further objective 10b is simplified. Instead of the step shape, the slit of the depressions 8b could, for example, also have a wedge shape.

Here, rays reflected with scattering by the optical surface 11 on the object side can be absorbed to an even greater extent, and the stepped depressions 8b pass through all four optical surfaces 11 of the optical elements 1 and 2.

By cementing the reflecting prism 15' to the first optical element 1 of the further objective 10b, it is possible to realize a quasimonolithic optical component which, owing to the generally high rigidity and the low coefficient of thermal expansion of inorganic optical material, has dimensional stability which is approximately comparable with that of a monolithic element of such a material. The individual optical elements and the respective segments of such a component are distinguished in particular by attitude stability—i.e. high positional and orientation stability—relative to one another. At the same time, owing to the stepped depressions 8b, substantial optical sealing of the first segment 6 relative to the second segment 7 and optical crosstalk of rays of the first pencil 4, scattered by the optical component, with the second pencil 5 of rays at the receiver 14 from FIG. 1 are very substantially prevented.

Here, in contrast to the first embodiment, a thin-walled black plastic part 19 is inserted into the depression for indirectly preventing optical crosstalk. Here, with the exception of an entry orifice and an exit orifice for the first and second pencil 4 and 5 of rays, respectively, it additionally surrounds the reflecting prism 15' in order additionally to suppress optical crosstalk.

For an optical component provided for another purpose, it would be just as possible, instead of a reflecting prism 15', to cement another optical element, for example a small, round lens, thereto after introduction of a corresponding depression.

Figure 4:
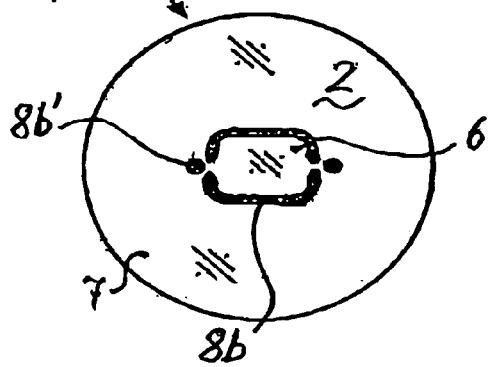
FIG. 4 shows the embodiment from FIG. 3 in cross-section.

FIG. 4 shows the second embodiment of the optical component according to the invention from FIG. 3, in cross-section, the inserted plastic part 19 not being shown, in contrast to FIG. 3. The sectional plane passes through the center of the second optical element 2 from FIG. 3. Here too, the first segment 6 is concentrically inside the second segment 7. In contrast to the first embodiment, in the second embodiment the basket-like, stepped depressions 8b, with the exception of two gaps, surround the first segment 6. Each of the two gaps serves as a web-like material bridge between the first and the second segment 6 and 7, respectively. By means of the material bridges, the first segment 6 is held securely and with a stable attitude relative to the second segment 7.

Advantageously, in each case a thin, bore-like depression 8b' can be introduced into the further objective 10b in the environment of the material bridges, in order to prevent direct propagation of rays of the first pencil which are scattered by the first segment 6, via the two material bridges. The bore-like depressions 8b' can be introduced into the component, for example, together with the stepped depressions 8b by means of the same lapping tool. However, it would-also be conceivable to introduce the two bore-like depressions 8b' into the component by means of a second shaping lapping tool through the optical surface 11 on the object side from FIG. 3, into the objective 10b, in a direction opposite to the step-like depressions 8b.

Of course, such web-like material bridges could also be provided in a depression not passing through the optical component—as in FIG. 1. As a result, the stability of such a component is even further increased, so that the first segment 6, in spite of the reflecting prism fastened thereto, withstands even extreme vibrational and shock stresses safely and with a stable attitude.

Figure 5:
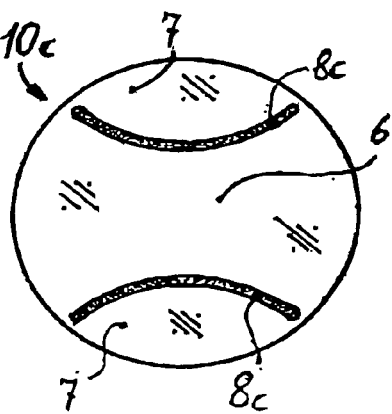
FIG. 5 shows a third embodiment of the component according to the invention as an objective for a surveying instrument according to FIG. 1, in cross-section.

FIG. 5 shows a third embodiment of the component according to the invention in cross-section, which component is in the form of a further objective 10c for a telescope having an integrated device for distance measurement. In contrast to the device from FIG. 1, however, the first pencil of rays is produced by an LED and, on passage through the further objective 10c, has a larger cross-section of the pencil of rays. The further objective 10c has a first segment 6 having a cross-section which is correspondingly larger compared with the objective 10*a* from FIG. 2. For two second pencils which contain rays reflected by the target object, here two second segments 7 are provided, which are arranged on both sides of the first segment 6 and surrounding said segment 6.

Two arc-shaped depressions 8*c* prevent, inside the device, optical crosstalk of rays of the first pencil which are scattered by the first segment 6 with the rays of the two second pencils of rays.

It would also be conceivable to coordinate not only one second segment 7 in each case, but also a separate receiver in each case, with each of the two second pencils of rays.

Furthermore, the two second pencils of rays, optionally even emitted rays produced by two light sources and the first pencil of rays could contain the rays reflected by the target object. Optical crosstalk of rays of the two second pencils, which are scattered by the second segments 7, with the rays of the first pencil would thus be prevented by the two arc-shaped depressions 8*c* inside the device.

Figure 6:
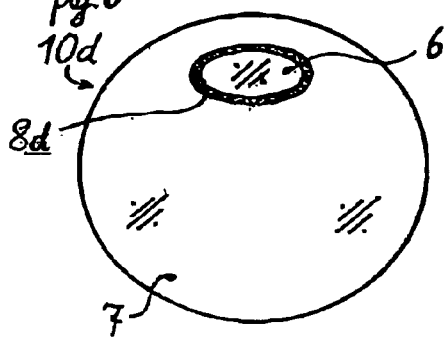
FIG. 6 shows a fourth embodiment of the component according to the invention as an objective for a surveying instrument according to FIG. 1, in cross-section.

FIG. 6 shows a fourth embodiment of the component according to the invention in cross-section, which is in the form of a further objective 10*d* for a telescope having an integrated device for distance measurement. In contrast to the device from FIG. 1, however, the first pencil of rays is arranged eccentrically with respect to the second pencil of rays.

The first segment 6 is accordingly arranged eccentrically inside the second segment 7 and here has an elongated elliptical cross-section which is appropriately adapted to the cross-section of the first pencil of rays which is produced here by a laser diode. Here, the slit-like, eccentrically arranged depression 8*d* surrounds the first segment 6 continuously all round. FIG. 7 shows a fifth embodiment of the component according to the invention in longitudinal section, which is in the form of a further objective 10*e* for a telescope having an integrated device for distance measurement. In contrast to the device from FIG. 1, here the first pencil 4 of rays is not directed via a central reflecting element onto the target object, which is not shown.

The objective 10*e* is in the form of a cemented component of two optical elements 1 and 2 and, in addition to a depression 8*e*, which is cylindrical here, has a continuous central recess 20. The central recess 20 can be introduced into the component together with the cylindrical depression 8*e* in one processing step by means of a common lapping tool. Here, a laser diode 21 producing the first pencil 4 of rays is directly inserted into one end of the central recess 20, and a collimator lens 22 is directly inserted into the other end.

The direct combination of the laser diode 21 with the cemented component of the objective 10*e* creates an electro-optical system which has an exceptional high stability of the orientation of the first pencil 4 of rays relative to the cemented component.

The inserted collimator lens 22 makes it possible to house a complete transmitting optical unit in the central region of the objective 10*e*, which unit is moreover actually optically shielded by means of the cylindrical depression 8*e* from the other parts of the device. Optical crosstalk of rays of the first pencil 4 which are scattered by the collimator lens 22 with the second pencil 5 of rays at the receiver shown only in FIG. 1 can thus be virtually completely prevented.

FIG. 8 shows a sixth embodiment of the component according to the invention, in side view. It is in the form of a quasimonolithic end element 10*f* for a multifunctional device, for example for automatic acquisition, surveying and documentation of target objects via three first and four second pencils of rays.

Here, the quasimonolithic end element 10*f* has a third optical glass element in the form of a convex carrier lens 3 and having a central first and four peripheral second segments 6 and 7' to 7'''', respectively. Here, the three first pencils of rays are coordinated with the first seament 6 and the four segments 7' to 7'''' are coordinated with one of the four second pencils of rays, respectively. Each of the four second segments 7' to 7'''' has in each case a different focal distance and is intended for a different purpose in each case. For avoiding optical crosstalk inside the device, a cylindrical depression 8*e* in the end element 10*f* is provided between the first segment 6 and the second segments 7' to 7''''. As can also be shown here, the four second segments 7' and 7'''' are each additionally optically shielded from one another by means of a radial depression 8*f*.

Here, the first segment 6 includes the central region of the carrier lens 3 and, for example, a planoconcave glass lens cemented to the carrier lens. The first second segment 7' is formed by a peripheral quarter segment of the carrier lens 3 as such. The second second segment 7" is formed by a further quarter segment of the carrier lens 3 with an applied thin film of sol gel or plastic, into which structures which permit, for example, aspherical corrections are introduced by an embossing technique. The third second segment 7''' is determined by a peripheral quarter segment of a diffractive lens. The fourth second segment 7'''' is determined by a peripheral quarter segment of a convexoconcave lens.

FIG. 9 shows a device for optical recording comprising an illumination means, in longitudinal section, which device has an imaging detector 25, a light source and a seventh embodiment of the component according to the invention, which is in the form of a one-piece objective 10*g* of the device.

The one-piece objective 10*g* has a first segment 6, with which a first pencil 4 of rays for illuminating an object not shown is coordinated, comprising a slightly matt optical surface 24 and a second segment 7 for a second pencil 5 of rays for optical recording of the object. The object to be recorded on the detector 25 is focused by means of the lens surfaces of the second segment 7 which are polished on both sides. The first pencil 4 of rays is scattered with refraction by the slightly matt optical surface 24 of the first segment 6 on the object side, with the result that the object is illuminated by diffuse light of uniform brightness.

A cylindrical depression 8*e* is introduced into the one-piece objective 10*g*, between the first and the second segment 6 and 7, respectively. Optical crosstalk of rays 9 of the first pencil 4 scattered with refraction by the optical surface 11 and scattered with reflection by the matt surface 24 with the second pencil 5 of rays can thus be reduced to a large extent on the imaging detector 25. The depression and the surface structure of the matt optical surface 24 can be introduced using the same tool. A device having integrated coaxial illumination and a very compact design can be easily produced in this manner.

FIG. 10 shows an eighth embodiment of the component according to the invention for a device, in longitudinal section, which is in the form of a beam splitter cube 10*h* for two pencils 4 and 5 of rays. It is composed of two plano-optical prisms cemented to one another and having a wavelength-selective layer 26 which reflects only the second pencil 5 of rays.

The beam splitter cube 10 h has a cylindrical first segment 6 for a cylindrical first pencil 4 of rays and an angled second segment 7 for the second pencil 5 of rays. In contrast to the second segment 7, the first segment 6 is a part of both prisms. In the beam splitter cube 10*h*, a cylindrical depression 8*e* which passes through the wavelength-selective layer 26 is introduced coaxially with the first segment 6 and all round the latter. As a result, rays of the first pencil 4 which are scattered with refraction by the rear optical surface 11 and scattered with refraction or reflection by the wavelength-selective layer 26 can be absorbed by the cylindrical depression 8e, which then can no longer cause any optical crosstalk with the second pencil 5 of rays.

FIG. 11 shows an embodiment of a component according to the invention, in longitudinal section, which is in the form of a further objective 10i for a device for transmitting and receiving a first and a second pencil 4 and 5 of rays, respectively. The optically effective axis of the first pencil 4 of rays, which is produced by a point light source, and the optical axis of the objective 10i are oriented coaxially with one another. In contrast to the preceding embodiments, the objective 10i has two semicircular segments 6 and 7 complementary to one another. A first segment 6 coordinated with the first pencil 4 of rays is arranged opposite a second segment 7 coordinated with the second pencil 5 of rays. This permits, for example, a semicircular, large pencil cross-section of the first pencil 4 of rays on passage through the objective 10i.

Virtually all rays of the first pencil 4 which are scattered by the optical surfaces 11 of the objective 10i and reflected inside said objective can be absorbed by means of a suitable, axial depression 8g along the optical axis and thus can no longer cause optical crosstalk with the second pencil 5 of rays via the second segment 7. Here, the axial depression 8g is in the form of a blind bore having a small diameter of, for example, half a millimeter, and extends here up to the vicinity of the optical surface 11 on the object side.

FIG. 12 shows an embodiment of a component according to the invention for focusing a first pencil of rays, in longitudinal section, which component is in the form of an objective lens 10j of binoculars here. Here, a viewing pencil to be focused by the binoculars forms the first pencil 4 of rays. Sunlight or rays of other extraneous light sources which enter the objective lens 10j obliquely relative to the first pencil 4 of rays form the second pencil 5 of rays here.

A first part of the second pencil 5 of rays which is incident steeply on the objective lens 10j strikes a region of the all-round edge surface 27 of the objective lens 10j. Without suitable measures, rays scattered by the all-round edge surface 27 can cause optical crosstalk with the first pencil 4 of rays to be focused, for example in the eye of a user of the binoculars—the receiver of the imaging system. This optical crosstalk is evident as a rule from a perceptible reduction in the image contrast.

According to the invention, at least one all-round depression 8h is introduced into the all-round edge surface 27. Firstly, rays of the second pencil 5 which are reflected with scattering by that part of the edge surface which is on the object side are absorbed by said depression, with the result that they can no longer cause any optical crosstalk with the first pencil 4 of rays. Secondly, rays of the second pencil 5 are directly trapped by the all-round depression 8h—in the manner of a diaphragm—with the result that they can no longer reach that part of the edge surface 27 which is on the receiver side and cause optical crosstalk via rays scattered thereon. By means of the all-round depression 8h integrated in the component and simultaneously acting as a light trap and diaphragm, scattered extraneous light can be reduced and hence the image contrast of the imaging can be increased. The image contrast experiences no degradation in the receiver plane.

The at least one all-round depression 8h can be introduced into the optical component by means of a corresponding ultrasonic lapping tool or by means of, for example, drilling with the use of diamonds.

The invention claimed is:

1. An optical component for a device for emitting a first pencil of rays and for receiving at least one second pencil of rays, the optical component comprising:
   a one-piece element of glass, quartz or other inorganic optical material, comprising a first segment refracting the first pencil of rays and at least one second segment refracting the at least one second pencil of rays,
   the first segment being substantially surrounded by the at least one second segment,
   wherein a depression is provided which substantially surrounds the first segment and is formed in such a way that
   optical crosstalk of rays of the first pencil which are scattered by the component with the at least one second pencil of rays is substantially prevented indirectly or directly inside the device.

2. The optical component as claimed in claim 1, wherein the depression is in the form of a slit, and the depth of the slit of the depression extends substantially parallel to the direction of propagation of the first pencil of rays.

3. The optical component as claimed in claim 2, wherein the depression passes at least partly through the optical component.

4. The optical component as claimed in claim 2, wherein the depression does not pass through the optical component and, in the region of the depression, the optical component has a remaining material thickness of less than a quarter, of the depth of the slit.

5. The optical component as claimed in claim 4, wherein the depth of the slit has at least three times the value of the width of the slit.

6. The optical component as claimed in claim 4, wherein the width of the slit has a value which is less than one and a half millimeters.

7. The optical component as claimed in claim 4, wherein a single continuous, optionally differently curved depression which continuously surrounds the first segment is provided.

8. The optical component as claimed in claim 1, wherein a plurality of optionally differently shaped depressions are provided.

9. The optical component as claimed in claim 1, wherein the surface of the depression is provided with a coating, dye or ink or with a metallic or dielectric reflecting coat.

10. The optical component as claimed in claim 1, wherein, for indirect prevention of optical crosstalk, a solid or a filler opaque to radiation, is introduced into the depression.

11. The optical component as claimed in claim 1, wherein the one-piece element is in the form of a round optical element or in the form of a plano-optical element.

12. A device for distance measurement, comprising an optical component as claimed in claim 1 and a receiving pencil coaxial with the transmitting pencil, wherein
   the transmitting pencil and the receiving pencil form the first and the at least one second pencil of rays, respectively.

13. A surveying instrument comprising a device for distance measurement as claimed in claim 12, comprising a sighting telescope and optionally comprising a device for automatic target acquisition with an illuminating pencil and a target acquisition pencil, wherein
   the optical component is provided as an objective for the sighting telescope.

* * * * *